(12) United States Patent
Hostetter et al.

(10) Patent No.: US 12,422,789 B2
(45) Date of Patent: Sep. 23, 2025

(54) AUTOMATED WELLHEAD MONITORING AND CONTROL SYSTEM

(71) Applicant: Stearns, Conrad and Schmidt, Consulting Engineers, Inc., Reston, VA (US)

(72) Inventors: David Hostetter, Lancaster, PA (US); Philip Carrillo, Sunset Beach, CA (US); Melissa Russo, Long Beach, CA (US); Christopher Carver, Murfreesboro, TN (US)

(73) Assignee: STEARNS, CONRAD AND SCHMIDT, CONSULTING ENGINEERS, INC., Reston, VA (US)

( * ) Notice: Subject to any disclaimer, the term of this patent is extended or adjusted under 35 U.S.C. 154(b) by 403 days.

(21) Appl. No.: 17/961,603

(22) Filed: Oct. 7, 2022

(65) Prior Publication Data
US 2023/0115676 A1    Apr. 13, 2023

Related U.S. Application Data

(60) Provisional application No. 63/253,252, filed on Oct. 7, 2021.

(51) Int. Cl.
| | | |
|---|---|---|
| G05B 13/02 | (2006.01) |
| E21B 34/02 | (2006.01) |
| E21B 47/06 | (2012.01) |
| E21B 47/10 | (2012.01) |
| G05B 23/02 | (2006.01) |

(52) U.S. Cl.
CPC ............ *G05B 13/021* (2013.01); *E21B 34/02* (2013.01); *E21B 47/06* (2013.01); *E21B 47/10* (2013.01); *G05B 23/024* (2013.01); *G05B 2219/25312* (2013.01); *G05B 2223/06* (2018.08)

(58) Field of Classification Search
CPC ................ G05B 13/021; G05B 23/024; G05B 2219/25312; G05B 2223/06; E21B 34/02; E21B 47/06; E21B 47/10; E21B 34/16; B09B 1/006
See application file for complete search history.

(56) References Cited

U.S. PATENT DOCUMENTS

| | | | |
|---|---|---|---|
| 11,181,872 B1 * | 11/2021 | Herring, III | D21F 7/00 |
| 2009/0012653 A1 * | 1/2009 | Cheng | F23N 5/242 |
| | | | 700/287 |
| 2013/0068314 A1 * | 3/2013 | Beeler | F04D 17/161 |
| | | | 60/407 |
| 2020/0101504 A1 * | 4/2020 | Quigley | B09C 1/005 |
| 2022/0154568 A1 * | 5/2022 | Fink | F25J 1/0221 |

* cited by examiner

Primary Examiner — Rami R Okasha
(74) Attorney, Agent, or Firm — Maier & Maier, PLLC

(57) ABSTRACT

An automated wellhead monitoring and control system. The system is communicatively coupled to one or more LFG wellheads as well as other desired landfill components. The system receives and aggregates both real-time and historical data related to the operation of landfill components at a single site and/or integrates numerous sites for comparison. The system controls the LFG wellheads and other desired landfill components based on the real-time, forecasted, and historical data, and utilizes various algorithms, including machine learning and artificial intelligence, to effectuate such control.

17 Claims, 2 Drawing Sheets

AUTOMATED WELLHEAD MONITORING AND CONTROL SYSTEM

CROSS-REFERENCE TO RELATED APPLICATIONS

The present patent application claims benefit and priority to U.S. Provisional Patent Application No. 63/253,252 filed on Oct. 7, 2021, which is hereby incorporated by reference into the present disclosure.

BACKGROUND

Landfill gas (LFG) is a natural byproduct of the decomposition of organic material in landfills. Landfill gas is composed of approximately 50% carbon dioxide and 50% methane, both of which contribute to the greenhouse effect, with methane being about 26-38 times more effective than carbon dioxide at trapping heat in the atmosphere. To prevent LFG from escaping into the air, it may be captured, and processed, converted into a renewable energy resource, or burned at a flare.

LFG may be extracted from landfills using a well system that includes a plurality of well pipes and wellheads distributed throughout the landfill. The well pipe extends below the surface of the landfill, while the wellhead is coupled to the upper end of the well pipe and includes components for receiving the gas from the well pipe and directing it to a collection pipe towards one or more consolidation locations for subsequent processing or burning.

The wellheads must be monitored so as to ensure proper functionality, prevent unwanted escape of LFG, and adherence to operational parameters which are driven by federal and state regulations and the desire to produce energy from LFG. Improper operation of the wellheads may result in excess emissions to the atmosphere, gas migration, disruption of anaerobic decomposition and/or subsurface fires. Day-to-day operations of the landfill gas extraction system include measuring a number of factors at the wellheads and then adjusting control valves so as to ensure a proper balance of the system and a proper LFG flow rate, among other factors. A centralized and automated wellhead monitoring and control system is therefore desired.

SUMMARY

According to at least one exemplary embodiment, an automated wellhead monitoring and control system is disclosed. The system may be communicatively coupled to one or more LFG wellheads as well as other desired landfill components. The system may receive and aggregate both real-time and historical data related to the operation of landfill components at a single site and/or integrate numerous sites for comparison. The system may control the LFG wellheads and other desired landfill components based on the real-time, forecasted, and historical data, and may utilize various algorithms, including machine learning and artificial intelligence, to effectuate such control.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
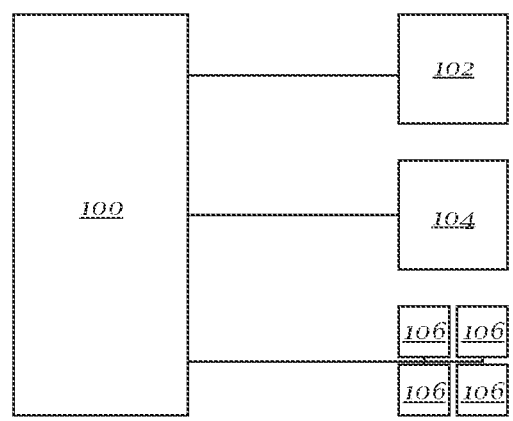
FIG. 1 shows an exemplary embodiment of an automated wellhead monitoring and control system.

According to at least one exemplary embodiment, and as shown in FIG. 1, an automated wellhead monitoring and control system 100 is disclosed. System 100 may be provided on a non-transitory computer-readable medium and may be communicatively coupled to multiple landfill monitoring and control devices. System 100 may include both hardware and software components that can enable system 100 to control wellhead components, for example a wellhead valve, based on different inputs, including sensor readings, location-based data, weather data, on-site environmental conditions, off-site environmental conditions, satellite, aircraft and drone monitoring, and so forth. System 100 may allow for remote monitoring of the wellheads as well as remote adjustment of the wellheads. A control unit may receive various input, such as the data or sensor readings, and may control the system 100 by controlling wellhead components. The control unit may be, for example, a processor and memory, and may be connected to or remotely configurable by the use of a cloud platform.

System 100 may be communicatively coupled to and may receive data from sensors coupled to LFG wells 102 and pneumatic and electric pumps 104 associated with dual-extraction LFG wells. System 100 may further be communicatively coupled to one or more other landfill equipment 106, including, but not limited to, gas analyzers, blower/flare stations, landfill gas to energy plants, renewable natural gas plants, distributed monitoring locations, air monitoring systems, drones/aircraft/satellites, geographic information system/software (GIS), video surveillance, filling and site operations, condensate monitoring stations, leachate monitoring stations, air compressors, tanks, and so forth. System 100 may gather and record data from LFG wells 102, pneumatic and electric pumps 104, and other equipment 106, so as to facilitate the functionality of system 100 as disclosed herein.

Figure 2:
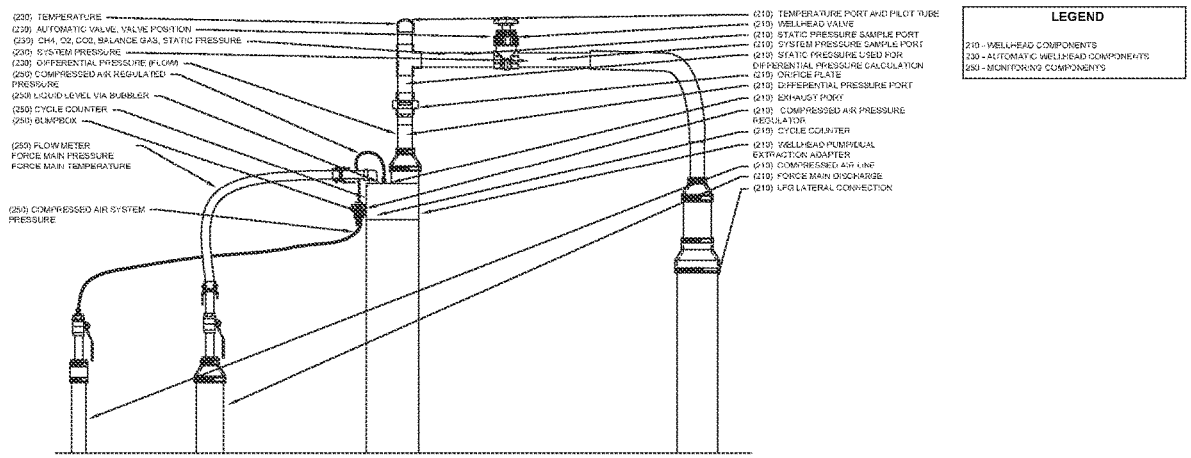
FIG. 2 shows an exemplary embodiment of an automated dual extraction wellhead.

FIG. 2 shows an exemplary dual extraction wellhead 200 which may be utilized to work with the embodiments disclosed herein. Wellhead 200 may include multiple wellhead components 210, including but not limited to, a temperature port, wellhead valve, static pressure sample port, system pressure sample port, static pressure used for differential pressure calculation, orifice plate, pitot tube, differential pressure port, exhaust port, compressed air pressure regulator, cycle counter, wellhead pump/dual-extraction adapter, compressed air line, LFG lateral connection, forcemain discharge, and so forth. In some exemplary embodiments, components 210 may be communicatively coupled to system 100 so as to provide data thereto and receive instructions or control signals to be controlled thereby.

The pneumatic pump of wellhead 200 may include pneumatic pump monitoring components 250, including, but not limited to, a compressed air system pressure sensor, a compressed air regulated pressure sensor, a liquid level sensor (for example, via bubbler pressure), a cycle counter, a flow meter, a forcemain pressure sensor, a forcemain temperature sensor, and so forth. As a component controlled by system 100, the pneumatic pump may also include a bump box. The bump-box may be configured to automatically restart stalled pneumatic pumps. In some exemplary embodiments, pneumatic pump monitoring components 230 including the bump box may be communicatively coupled to system 100 so as to provide data thereto and to be controlled thereby. The pump may also be an electric pump and monitoring components may include but are not limited to, a liquid level sensor, a flow meter, a forcemain pressure sensor, a forcemain temperature sensor, pump status, pump runtime, pump alarms, and motor current. A flow meter may measure flow through a wellhead or other component and may identify totalized flow.

Wellhead 200 may further include automatic wellhead components 230, including, but not limited to, a temperature sensor, a system pressure sensor, a differential pressure (flow) sensor, a static pressure sensor, and sensors for methane, oxygen, carbon dioxide, and balance gas. As an automatic component controlled by system 100, wellhead 200 may further include an automatic valve with a valve position sensor. In some exemplary embodiments, automatic wellhead components 230 including the valve and valve position sensor may be communicatively coupled to system 100 so as to provide data thereto and to be controlled thereby. Many of the described variables may be adjusted by the control unit of system 100 by opening, closing, or adjusting the position of a valve. For example, the air compressors may be opened if the compressed air system provides a reading indicating the air pressure is too low, or may be closed or disabled when connecting to a component or system that does not require compressed air. The various sensors, monitoring components, and automatic components may be used to measure variables that are typically important to the operational and regulatory health of a landfill. System 100 may monitor such values and compare the values to the site-specific and location-specific setpoints for these values. These sensors include those shown in FIG. 2. The following sensors in FIG. 2 are located in the following locations and monitor the following variables:

TABLE 1

Wellhead Sensors

| Sensor | Location | Variable |
| --- | --- | --- |
| Temperature Sensor | 230 - on wellhead | Wellhead temperature |
| Valve Actuator Position Feedback Sensor | 230 - on wellhead valve | Valve percent open |
| Methane Sensor | 230 - on wellhead | Percent (vol) methane |
| Oxygen Sensor | 230 - on wellhead | Percent (vol) oxygen |
| Carbon Dioxide Sensor | 230 - on wellhead | Percent (vol) carbon dioxide |
| Static Pressure Sensor | 230 - on wellhead, between valve and the well | Static pressure |
| System Pressure Sensor | 230 - on the wellhead, between the valve and the lateral | System pressure |
| Differential Pressure Sensor | 230 - on the wellhead, across a flow measuring device | Flow measuring device differential pressure |

When a value exceeds or declines beyond the setpoint, an adjustment can be made. The following setpoints may use the following equipment to help the system achieve the setpoint.

TABLE 2

Sensors and Adjustable Variables

| Sensor | Variable | Setpoint | Equipment Used to Meet the Setpoint |
| --- | --- | --- | --- |
| Temperature Sensor | Wellhead temperature | Adjustable based on individual well requirements | Wellhead, blower, LFG valves |

TABLE 2-continued

Sensors and Adjustable Variables

| Sensor | Variable | Setpoint | Equipment Used to Meet the Setpoint |
|---|---|---|---|
| Valve Actuator Position Feedback Sensor | Valve percent open | Equal to the commanded percent open - when the measured value does not equal the commanded value over an adjustable period of time, a valve failure alarm will be created | Wellhead |
| Methane Sensor | Percent (vol) methane | Adjustable based on individual well requirements | Wellhead, blower, LFG valves |
| Oxygen Sensor | Percent (vol) oxygen | Adjustable based on individual well requirements | Wellhead, blower, LFG valves |
| Carbon Dioxide Sensor | Percent (vol) carbon dioxide | Adjustable based on individual well requirements | Wellhead, blower, LFG valves |
| Static Pressure Sensor | Static pressure | Adjustable based on individual well requirements | Wellhead, blower, LFG valves |
| System Pressure Sensor | System pressure | Adjustable based on individual well requirements | Wellhead, blower, LFG valves |
| Differential Pressure Sensor | Flow measuring device differential pressure | Adjustable based on individual well requirements | Wellhead, blower, LFG valves |
| Methane Sensor and Differential Pressure Sensor | Energy Content of the Gas | Adjustable based on individual well requirements | Wellhead, blower, LFG valves |

System 100 may contain groups of setpoints so that the system can be controlled logically. Groups of setpoints may be arranged hierarchically. For example, system 100 may be configured to control a primary variable, such as the energy content of the gas, to a setpoint while other secondary variables, such as percent (vol) oxygen and wellhead temperature, have an acceptable range defined between a high and low setpoint. If either of the secondary variables exceed their range for a period of time, the system can automatically switch to temporarily control the affected secondary variable and bring it back to within the normal range. After the secondary variable has been maintained within the normal range for a period of time, the system will automatically change back to control the primary variable. If this automatic change over occurs more times than what is acceptable in a given period of time, an alarm may be sent out to the users.

Such setpoints and their hierarchy can be set by users or automatically by AI, big data, and machine learning techniques. Setpoints may be communicated to on-site control equipment which may command equipment to carry out actions to maintain the setpoints.

Data from the various components and sensors enumerated above and communicatively coupled thereto may be collected for each LFG well and transmitted to system 100, which may be, for example, an on-site or cloud-based control system. In an exemplary embodiment, sensors may be deployed to each wellhead and pump. The sensors on the wellhead may measure temperature, valve position, gas content such as CH4, O2, CO2, static pressure, system pressure, and/or differential pressure/flow. Sensors on a pneumatic pump may measure compressed air system pressure, compressed air regulated pressure, liquid level, number of cycles, flow, forcemain pressure, and/or forcemain temperature. Sensors on an electric pump may measure motor current, pump status, pump runtime, pump alarms, liquid level, number of cycles, flow, forcemain pressure, and/or forcemain temperature.

In an exemplary embodiment, multiple variables on the wellhead may be measured and controlled. The following table includes a listing of included sensors, the measured variables, and the potential actions or reactions an exemplary embodiment may implement after identifying the variable is out of range.

TABLE 3

Wellhead Actions

| Sensor | Variable | Reaction to Value too High | Reaction to Value too Low |
|---|---|---|---|
| Temperature Sensor | Wellhead temperature | Close the wellhead valve | Open the wellhead valve |
| Valve Actuator Position Feedback Sensor | Valve percent open | Alarm | Alarm |

TABLE 3-continued

Wellhead Actions

| Sensor | Variable | Reaction to Value too High | Reaction to Value too Low |
|---|---|---|---|
| Methane Sensor | Percent (vol) methane | Open the wellhead valve | Close the wellhead valve |
| Oxygen Sensor | Percent (vol) oxygen | Close the wellhead valve | Open the wellhead valve |
| Carbon Dioxide Sensor | Percent (vol) carbon dioxide | Alarm | Alarm |
| Carbon Dioxide and Methane Sensors | Percent (vol) methane/percent (vol) carbon dioxide | Alarm - indication that a sensor is broken | Alarm and close the wellhead valve |
| Static Pressure Sensor | Static pressure | Close the wellhead valve | Open the wellhead valve |
| System Pressure Sensor | System pressure | Slow down blower | Speed up blower |
| Differential Pressure Sensor | Flow measuring device differential pressure | Close the wellhead valve | Open the wellhead valve |
| Methane Sensor and Differential Pressure Sensor | Energy Content of the Gas | Close the wellhead valve | Open the wellhead valve |

The data may be transmitted by a wired or wireless connection, or a combination thereof, for example over an internet connection or via Bluetooth, Wi-Fi, radios, cellular devices, satellite-based devices, and the like. An exemplary embodiment may include a central control system configured to receive the sensor data and to control the various wellhead and pump components to maintain setpoint values and the like. Beyond setpoint based controls, users may command the system to perform actions such as to open a valve to a certain percent open, close a valve, etc. These commands and setpoint changes may be issued remotely, from the site, or at the facility.

The control system may also receive commands from a cloud-based remote monitoring and control system, may execute logic-based commands, and may transmit new commands to the individual LFG wells. The control system may also gather data from the individual LFG wells.

Data gathered by the system may be compiled and reviewed by system 100. Such data may be historical data as well as real-time data. Historical data may be used by the system to identify long term trends and precursors to alarms, shutdowns, and failures. The use of historical data may be to inform and optimize current and future operations of the system including but not limited to the optimization of the controls techniques and the avoidance of shutdowns and failures.

Based on the data, and utilizing algorithms, including, but not limited to, artificial intelligence, machine learning, and big data techniques, system 100 may send commands to one or more individual LFG wells, pumps, as well as the other landfill components, so as to control the LFG wells, pumps, and other components. System 100 may utilize data from various components, including, but not limited to, LFG wellhead data, liquid level, silt, available perforations, well damage, and well construction data, weather data, location-based data, data pertaining to design and operation concerns, data pertaining to LFG well-specific overrides, and so forth. Historical well data may include past values associated with a well or past data associated with one or more other wells. The location of the well may account for the proximity to a side slope, other wells, probes, and the like. The type and construction of the well may also be considered. Weather conditions may include current, future, and historical weather. For example, it may be contemplated that a location or region includes a weather profile indicating year-round weather predictions. Weather forecasts may also be produce which identify future weather events based on meteorological and other available data. An exemplary embodiment may predict future performance based on the weather data. This and other data may be used for the following exemplary purposes:

TABLE 4

Data Commands

| Data | Purpose | Possible Actions |
|---|---|---|
| Historical well data | Analyzing past performance and predicting future performance and optimizing the controls | Adjusting setpoints for that well or the overall system |
| LFG wellhead data | Identifying the performance of the gas collection at the well | Adjusting setpoints for that well or the overall system |
| Liquid level, silt, available perforations, well damage, and well construction data | Identifying the capability of the well to collect gas given it's physical condition | Adjusting setpoints for that well or the overall system |
| Weather data | Identifying how the current weather is affecting the system, | Adjusting setpoints for that well or the overall system |

TABLE 4-continued

Data Commands

| Data | Purpose | Possible Actions |
| --- | --- | --- |
| | how the past weather affected the system, and predicting how future weather may impact the system | |
| Location-based data | Identifying how the location of the well in relationship to other wells and features such as probes, side slopes, etc. is impacting its performance | Adjusting setpoints for that well or the overall system |
| Design and operation concerns data | Identifying how the design and operation of the well impact its and the system's performance | Adjusting setpoints for that well or the overall system |
| LFG-well specific overrides | Identifying how a non-standard setpoint (e.g., a higher than normal operating temperature setpoint), affects its and the system's performance | Adjusting setpoints for that well or the overall system |

System 100 may allow users to review both real-time and historical data via various interfaces. Such interfaces may include, but are not limited to, graphs, tables, heatmaps, numerical indicators, key performance indicators, dashboards, maps (including GIS maps), aerial imagery and monitoring results, and automatic reports generated by system 100. System 100 may further generate alarms and notifications, for example, in the event that any component communicatively coupled to the system is not operating within desired or indicated parameters. Heatmaps may be generated by an exemplary embodiment and may indicate a location and/or concentration of vacuum, temperature, flow, methane, oxygen, energy content, liquid levels, and the like. Heatmaps may be formed using any contemplated sensor. For example, infrared or optical cameras may be implemented in addition to the sensors to identify leaks. Surface emission monitoring (SEM) data may also be indicated on a heatmap by an exemplary embodiment. System 100 may further be utilized to control multiple sites within an enterprise, and allow users to view high-level from such multiple sites so as to provide an overview of the operation of the enterprise. Data regarding field worker activities may also be reviewed by system 100, and instructions may be sent out to field workers, as desired.

System 100 may allow users to enter measurements into the system using a mobile electronic device or computer. These measurements may be entered manually by the user or automatically via a connection to a sensor or device.

In some exemplary embodiments, system 100, in addition to receiving information from landfill components and equipment, may also control the such. The components and equipment that may be controlled by system 100 may include, but are not limited to, LFG wells, blower/flare stations, pumps, tanks, valves, air compressors, landfill gas to energy plants, liquid treatment plants, odor systems and so forth. The table below outlines how equipment may be controlled in an exemplary embodiment:

TABLE 5

Equipment Controls

| Equipment | Sensor/reading | Result |
| --- | --- | --- |
| LFG wells | See above | See above |
| Blower/flare stations | If a sufficiently large group of wells would benefit from more or less vacuum or flow | Increase or decrease system vacuum or flow Enable or disable or modulate the capacity of end uses such as flare stations, LFG to energy plants, etc. |
| Pumps | Liquid levels too high or too low Surging in vacuum or flow | Enable or disable or modulate the capacity of pumps |
| Tanks | Liquid levels too high or too low | Enable or disable or modulate the capacity of pumps Enable or disable tanks |
| Valves | If a sufficiently large group of wells would benefit from more or less vacuum or flow | Open or close the LFG header valve to increase or decrease the available flow and vacuum |
| Air compressors | Compressed air system pressure too low Air compressor shutdown | Enable additional air compressors or increase air compressor capacity Remotely/automatically restart the air compressor |
| LFG to energy plants | Available flow and/or energy content is too high or too low | Enable, disable, or modulate the capacity of the plant |
| Liquid treatment plants | Liquids flows too high or too low and/or too much or too little stored liquids | Enable, disable, or modulate the capacity of the plant |

TABLE 5-continued

Equipment Controls

| Equipment | Sensor/reading | Result |
| --- | --- | --- |
| Odor systems | Facility receives odor complaints, measured odors or odor surrogates are too high or too low, and/or the current or predicted weather changes | Enable, disable, or modulate the capacity of the odor treatment system or portions of the system. Alert the operations staff to change their operations such as adding additional daily cover, exposing less working face, generating less dust, halting operations, etc. |

As identified in the table above, System 100 may further control the equipment on the landfill together, as an overall system, rather than as disparate parts. Control may be via a command from system 100 to field equipment or an instruction sent out to a field worker. For example, if no wellhead valve is completely open, system 100 may command an LFG blower to a lower speed which can generate a lower wellfield vacuum at a lower blower electrical power consumption and allow system 100 to command at least one of the wellhead valves to open completely. If more vacuum is needed, system 100 may command the blower to a higher speed, which may then cause system 100 to command a wellhead valve to close partially. Furthermore, for example, if the readings on a wellhead indicate that a valve position change may be beneficial, system 100 may send an instruction to a field worker's mobile electronic device that they should change the valve position. It should be appreciated that such examples are merely illustrative and should not be considered limiting.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for autonomously monitoring and controlling a wellhead, the system comprising:
a wellhead comprising a wellhead valve, wherein the wellhead valve is adjustable by a control unit to open and/or close to a specified position and for a specified amount of time;
a plurality of sensors to identify a plurality of variables;
a control unit configured to receive data related to the variables from the plurality of sensors and to maintain a plurality of setpoint values of the variables by adjusting a plurality of wellhead equipment, wherein the control unit is configured to maintain the setpoint value of a primary variable from the plurality of variables and monitor for a plurality of secondary variables from the plurality of variables, wherein the primary variable is constantly monitored and adjusted to maintain the associated setpoint value of the primary variable, wherein the secondary variables are monitored and adjusted to maintain a range associated with the setpoint values of the secondary variables, wherein the secondary variables are adjusted by the control unit if the associated setpoint values of the secondary variables exceeds or declines beyond the range, wherein the control unit maintains the setpoint values of the primary and secondary variables based on a hierarchy, wherein a position of the primary and secondary variables in the hierarchy is changed when at least one of the primary or secondary variables exceeds or declines beyond the range, and wherein the control unit is configured to send a warning if a predetermined number of changes in the hierarchy occur within a predetermined amount of time.

2. The system of claim 1, further comprising:
a temperature sensor for measuring wellhead temperature, a valve actuator position feedback sensor for measuring a position of the wellhead valve, a methane sensor for measuring a methane percentage by volume, oxygen sensor for measuring an oxygen percentage by volume, a carbon dioxide sensor for measuring a carbon dioxide percentage by volume, a static pressure sensor for measuring static pressure, a system pressure sensor for measuring system pressure, and a flow meter for measuring a flow rate through the wellhead.

3. The system of claim 1, further comprising a cloud-based platform configured to communicate with the control unit, wherein the cloud-based platform can set the plurality of setpoint values of the variables.

4. The system of claim 1, wherein the control unit is configured to store the received data to a historical database.

5. The system of claim 4, wherein the control unit is configured to adjust one or more setpoint values to a non-standard setpoint value, record the setpoint values of the variables, and identify a system performance based on the variables, and compare the identified system performance with a historical system performance from the historical database.

6. The system of claim 4, wherein the control unit is configured to identify a historical weather profile from the historical database, receive a future weather forecast, and predict a future performance based on the future weather forecast.

7. The system of claim 1, wherein the wellhead equipment includes at least one pump, tank, valve, blower/flare station, air compressor, landfill gas LFG to energy plant, liquid treatment plant, and odor treatment system.

8. The system of claim 7, wherein the control unit is configured to increase or decrease system vacuum or flow using the blower/flare stations and/or landfill gas to energy plants.

9. The system of claim 7, wherein the control unit is configured to enable, disable, or modulate at least one pump in response to a liquid level in a receiving device or a well, or in response to the flow rate or totalized flow.

10. The system of claim 7, wherein the control unit is configured to enable or activate at least one air compressor if a compressed air system pressure is below the associated setpoint value or disable compressed air to one or more devices that do not require compressed air.

11. The system of claim 7, wherein the control unit is configured to enable or disable the landfill gas to energy plant if an available energy content is beyond the associated setpoint value or below the associated setpoint value.

12. The system of claim 7, wherein the control unit is configured to enable or disable the liquid treatment plant if a liquid flow or if an amount of stored liquid is beyond the associated setpoint value or below the associated setpoint value.

13. The system of claim 1, wherein the hierarchy is determined by AI or machine learning algorithms.

14. The system of claim 1, wherein the warning may be at least one of excess emissions to the atmosphere, gas migration, disruption of anaerobic decomposition and/or subsurface fires.

15. A method for autonomously monitoring and controlling a wellhead, the method comprising:
    identifying a plurality of wellhead variables using a plurality of sensors on the wellhead;
    storing the plurality of wellhead variables in real time to a historical database;
    comparing the plurality of wellhead variables to a plurality of associated setpoint values, wherein each variable is associated with at least one setpoint value;
    monitoring a primary variable from the plurality of wellhead variables and adjusting a wellhead valve position to maintain the primary variable at the associated setpoint value;
    monitoring one or more secondary variables from the plurality of wellhead variables, identifying that one or more of the secondary variables has exceeded or declined beyond a threshold range, and adjusting the wellhead valve position for a predetermined period of time to maintain the secondary variables within the range;
    maintaining the setpoint values of the primary and secondary variables based on a hierarchy;
    changing a position of the primary and secondary variables in the hierarchy when at least one of the primary or secondary variables exceeds or declines beyond the range; and
    sending a warning if a predetermined number of changes in the hierarchy occur within a predetermined amount of time.

16. The method of claim 15, further comprising forming a heatmap from the monitored primary and secondary variables.

17. The method of claim 15, further comprising receiving an instruction to adjust the wellhead valve position from a cloud-based platform.

* * * * *